Dec. 6, 1960

H. SEIDEL 2,963,661

WAVE GUIDE FILTER

Filed May 9, 1956

2 Sheets-Sheet 1

INVENTOR
H. SEIDEL
BY Roy M. Porter, Jr.
ATTORNEY

Dec. 6, 1960 | H. SEIDEL | 2,963,661

WAVE GUIDE FILTER

Filed May 9, 1956 | | 2 Sheets-Sheet 2

INVENTOR
H. SEIDEL
BY Roy M. Porter Jr.
ATTORNEY

United States Patent Office 2,963,661
Patented Dec. 6, 1960

2,963,661

WAVE GUIDE FILTER

Harold Seidel, Plainfield, N.J., assignor to Bell Telephone Laboratories, Incorporated, New York, N.Y., a corporation of New York Filed May 9, 1956, Ser. No. 583,670

9 Claims. (Cl. 333—9)

Figure 1:
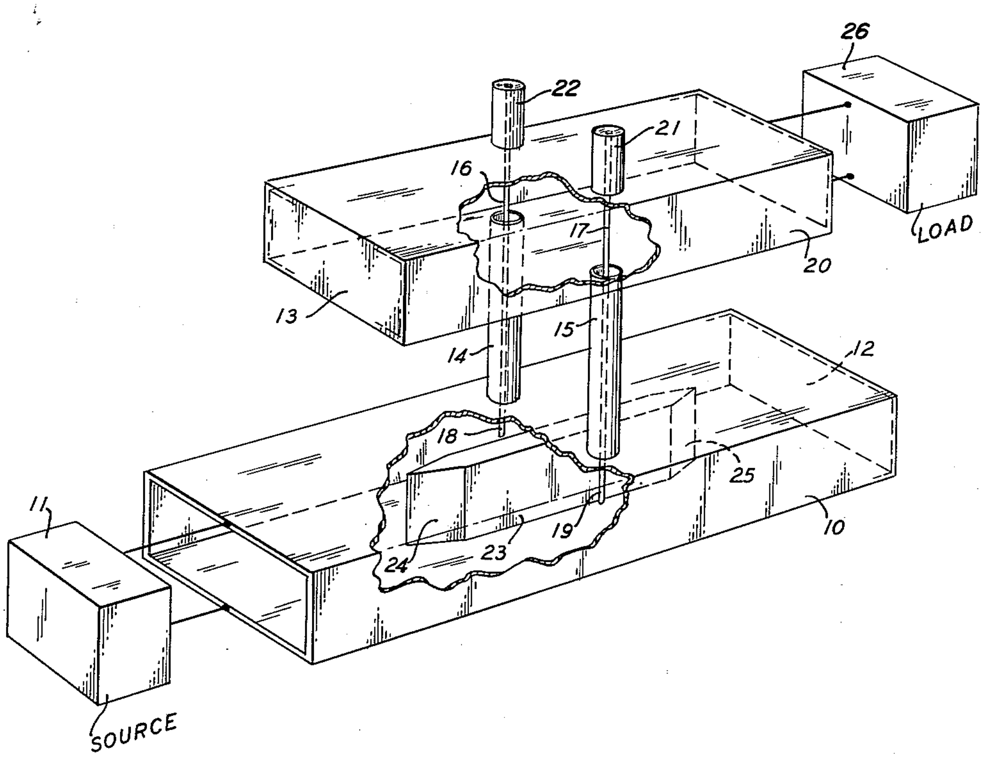

This invention relates to frequency-selective wave guide transmission systems and, more particularly, to anhormonic band-pass filters for use in such systems.

Conductively bounded hollow pipe wave guides have found numerous and varied applications in the communications art for the transmission of electromagnetic wave energy in the microwave frequency range. Such extensive use of this form of transmission line has made it desirable to have a wide variety of circuit components available for influencing the transmission characteristics of such lines. Among these circuit components, one of the more important is the wave guide filter, a component capable of distinguishing between different frequencies of wave energy. Wave guide filters of the band-pass type have heretofore usually been constructed by forming a resonant cavity between two conductive elements displaced longitudinally within a wave guide in the path of propagating wave energy. Multiple reflections from these conductive obstacles give rise to constructive and destructive interference of the propagating waves which influences the output of the filter in a frequency-selective manner. When the distance between these obstacles becomes substantially equal to an integral multiple of a half-wavelength of the wave energy in the guide, energy is freely transmitted past the obstacles while at all other frequencies the energy is substantially all reflected from the obstacles. Such a device does not respond at a single frequency, however, but at an infinite number of discrete frequencies corresponding to different integral multiples of a half-wavelength. The lowest frequency of response, corresponding to a single half-wavelength, is called the fundamental frequency and all higher frequencies of response are termed harmonics. For many applications, it is desirable to have a filter element that is anharmonic, that is one which will pass only the fundamental frequency and none of the harmonics. This characteristic is of particular importance, for example, in suppressing the higher harmonics, particularly the second harmonic, which might otherwise be generated in the transmission system. Conventional filters tuned to the desired frequency range would also pass all of these undesired higher harmonics. Furthermore, it has been found that the conventional type of filter will pass a band of frequencies symmetrically centered on the fundamental frequency to which the filter is tuned. For many applications, it is desirable to pass a band of frequencies the limits of which can be independently varied. This characteristic is of particular importance, for example, in multichannel communications systems where a large number of closely spaced frequency channels must be distinguished.

It is therefore an object of the present invention to introduce anharmonic band-pass characteristics into electromagnetic wave energy.

It is a more specific object of the invention to transmit a single discrete band of frequencies of electromagnetic wave energy the limits of which are independently variable and to reflect all other frequencies.

It has been recognized that the propagation characteristics of a conductively bounded wave guide are to a large extent dependent upon the properties of the medium within the guide. Introduction of material having a high index of refraction, such as dielectric material, will therefore change the propagation constant of the guide. Additionally, refractive material may be used to influence the field configuration of the wave pattern of propagating wave energy. This effect on the wave pattern will vary with frequency such that at higher frequencies a larger portion of the energy is concentrated in the refractive material. The effect of such loading can be better understood by recognizing the basic nature of the field pattern of wave energy within the wave guide.

Any field pattern within a wave guide may be considered as the summation of a plurality of plane wave components, or rays, which are directed, not along the axis of the guide, but at some angle thereto. These plane wave components proceed down the guide by multiple reflections from the guide walls and interact with one another within the guide to form the characteristic field patterns of the transmission mode. At cutoff, where no propagation takes place along the guide, these plane wave components are directed at right angles to the guide walls. At frequencies near cutoff, the plane wave components are directed at a large acute angle to the guide walls, but less than ninety degrees, and at frequencies far removed from cutoff the plane wave components are directed at a small acute angle to the guide walls. For different modes, the angle which the plane wave components made with the guide axis for any given frequency is not the same.

In accordance with the present invention, refractive material is used to provide a frequency selective distribution of the fluid pattern within an electromagnetic wave guiding structure and energy is extracted from this structure in a region in which the energy available for extraction is substantially different for different ranges of frequencies. More particularly, a wave guide is partially loaded with material having an index of refraction substantially greater than the index of refraction of the remaining medium within the wave guide. At the same time, means are provided for coupling wave energy from the wave guide in the region having the lower index of refraction. By a proper choice of materials, proportions and placement, a frequency-selective perturbation of the wave energy within the guide will take place such that substantial amounts of energy will be presented to the coupling means for one range of frequencies while substantially no energy will be presented to the coupling means for another range of frequencies. Such a device therefore acts as a band-pass filter in that the energy coupled from the guide will represent only a single discreate frequency range. The frequency-selective characteristics of this device can be better understood by considering the effect of the refractive material on the plane wave components of the wave propagated within the wave guide.

A plane wave, or elementary ray, is refracted or bent upon traveling from one region to another region having a different index of refraction. Such bending or refraction is due to the fact that different portions of the wave front arrive at the media interface at different times and, since the rays travel faster in the medium of the lower index of refraction, the wave front assumes a new direction of movement. With a proper angle of incidence of this plane wave, the rays will be refracted along the media interface itself, resulting in a form of surface wave which decays exponentially in the region having the lower index of refraction. The frequency for which this particular angle of plane wave incidence takes place will hereinafter be termed the critical frequency. It can be seen that all frequencies below the critical frequency will have a larger angle of incidence than the critical angle and hence energy at these frequencies will travel down the guide in the conventional manner, the plane wave components being multiply reflected from the guide walls. All frequencies above this critical frequency will have an angle of incidence less than the critical angle and hence energy at these frequencies will undergo total reflection at the medium interface and never leave the region of higher index of refraction. In the frequency range below the critical frequency, a coupling element, such as a probe, can be used to remove substantially all of the energy from the region of lower index of refraction. In the frequency range above the critical frequency, however, no energy will be presented to such a coupling probe since all of the energy is within the element having a high index of refraction. It is apparent that the device described acts as a frequency filter inasmuch as it provides separate transmission paths for different frequency components of an introduced signal.

It will be noted that this filter is an anharmonic device, that is, it will respond critically only at one frequency for any given mode and not to any of the higher multiples of this fundamental frequency. Furthermore, this critical frequency may be adjusted by changing the proportions and composition of the refractive loading in the guide. An independently adjustable lower frequency limit can be obtained merely by choosing a subsidiary transmission path of such a size as to place all frequencies below the desired pass band beyond cutoff.

The index of refraction of a transmission medium is dependent upon the product of the dielectric constant and the permeability constant of the material comprising the medium. Either or both of these qualities may be varied to change this product so long as the material remains substantially transparent to electromagnetic wave energy. This necessitates nonconductive material which will enable the waves to completely penetrate the medium. One advantage residing in the use of nonconductive material is the freedom from the electrical contact problems always present when a conductive element must be secured to the walls of a wave guide. Another advantage residing in the use of such material is the decrease in the danger of electrical breakdown through arcing usually present when higher power levels of energy are used.

These and other objects and features, the nature of the present invention and its various advantages, will appear more fully upon consideration of the specific illustrative embodiments shown in the accompanying drawings and described in detail in the following explanation of these drawings.

Figure 2:
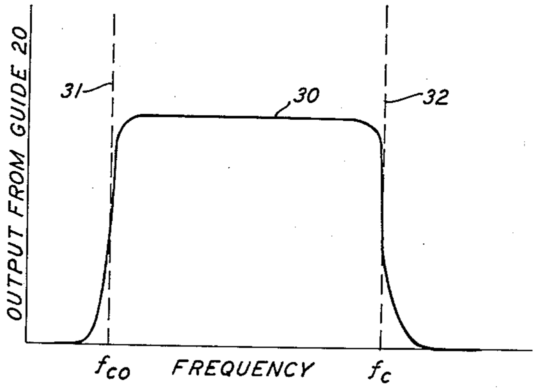
Figure 3:
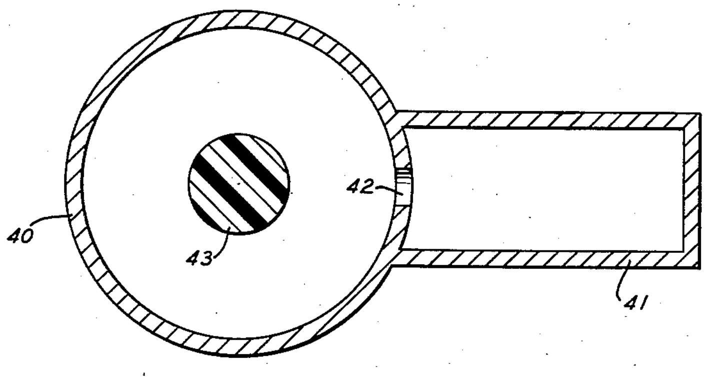
Figure 4:
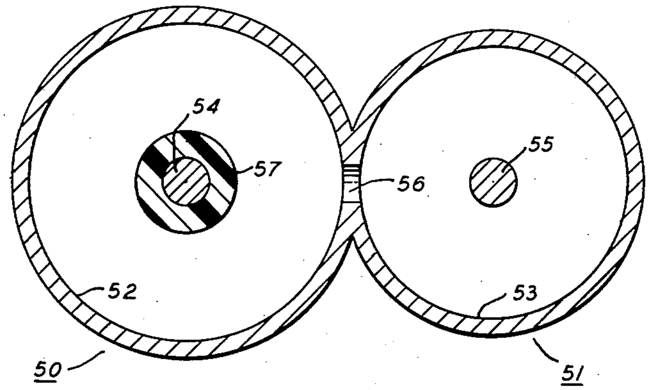

In the drawings:

Fig. 1 is a perspective view of a first principal embodiment of the invention showing a rectangular wave guide loaded with a refractive element and adapted for filter action in accordance with the principles of the invention;

Fig. 2, given for the purposes of illustration, is a graphical and qualitative representation of the frequency versus output response of the structure shown in Fig. 1;

Fig. 3 is a cross sectional view of a frequency branching device employing a loaded circular wave guide in accordance with the principles of the invention; and Fig. 4 is a cross sectional view of a frequency branching device employing a loaded coaxial wave guide in accordance with the principles of the invention.

Referring more particularly to Fig. 1, there is shown as a first specific illustrative embodiment of the invention an anharmonic band-pass filter comprising a first section of rectangular wave guide 10 having a wider dimension greater than a half-wavelength of the lowest frequency to be transmitted therein and a narrower dimension substantially equal to one-half of the wider dimension. Coupled to guide 10 through coaxial lines 14 and 15 is a second rectangular wave guide 20 having dimensions to be more fully described hereinafter. Center conductors 16 and 17 of coaxial lines 14 and 15, respectively, extend completely through guide 20 parallel to the narrower walls thereof and terminate in coaxial tuning stubs 22 and 21, respectively. The other end of center conductors 16 and 17 terminate in probes 18 and 19 in guide 10 parallel to the narrower walls thereof. Guide 10 is terminated by conductive wall 12 at a distance from probes 18 and 19 to provide an impedance match to lines 14 and 15 such that substantially all of the wave energy in guide 10 is coupled to coaxial lines 14 and 15 in accordance with principles well-known to the wave guide art. Guide 20 is also terminated by a conductive wall 13 at a distance from center conductors 16 and 17 such that substantially all of the energy in coaxial lines 14 and 15 is coupled into guide 20. While guides 10 and 20 are shown to be coupled by coaxial lines 14 and 15, it should be noted that any broad band coupling arrangement will serve equally well. Coaxial lines 14 and 15 may, for example, terminate in coupling loops instead of probes, a single coaxial line may be used instead of the pair of lines shown in Fig. 1, guides 10 and 20 may be coupled by means of apertures instead of coaxial lines or by any other means known to the art.

In accordance with the present invention, a rectangular element 23 is included within guide 10 in the region of coupling probes 18 and 19 to produce a frequency selective distribution of the wave energy within guide 10 such that for one range of frequencies a substantial energy level is presented to probes 18 and 19 and for another range of frequencies substantially no energy is presented to probes 18 and 19. More particularly, element 23 is composed of material having an index of refraction substantially greater than the index of refraction of the medium within guide 10. That is, element 23 is composed of nonconductive material having a dielectric constant $\epsilon_2$ greater than the dielectric constant $\epsilon_1$ of the medium in guide 10, a permeability $\mu_2$ which is greater than the permeability $\mu_1$ of the medium in guide 10 or both a dielectric constant and a permeability which are greater than the respective properties of the medium within guide 10. More particularly, element 23 may be composed of any material having dielectric and/or permeability constants such that the product $\sqrt{\mu_2\epsilon_2}$ for element 23 is greater than the value of $\sqrt{\mu_1\epsilon_1}$ for the medium within guide 10. As a specific illustrative embodiment, element 23 may be composed of dielectric material such as alumina having a dielectric constant of nine and the remainder of guide 10 may be filled with air having a dielectric constant of unity. Element 23 may, however, be composed of any dielectric or permeable material having the desired index of refraction and guide 10 may be filled with any suitable medium. The ends of element 23 are provided with knife-edge tapers 24 and 25 to prevent undue reflections of wave energy therefrom.

To understand the effect of element 23 on wave energy propagating within guide 10, it may be of aid to consider the character of such propagation. Any field pattern which is capable of being supported in guide 10 can be considered as a number of plane wave components, or rays, each of which is directed at an angle to the axis of propagation of the guide. These plane wave components, being directed at an angle to the guide walls as well as the guide axis, are reflected back and forth between these guide walls, proceeding in this fashion along the guide in the direction of propagation. At the cutoff frequency of guide 10, the plane wave components are directed at right angles to the guiding walls and therefore do not propagate along the axis of the guide. At frequencies near cutoff, the plane wave components are directed at a large acute angle to the guide walls and, at frequencies far removed from cutoff, the plane wave components are directed at a small acute angle to the guide walls. It can therefore be seen that between cutoff and the highest frequencies available, the angle of incidence of the plane wave components on the guide walls can be varied from ninety degrees to almost zero, each angle corresponding to a different frequency. These plane wave components interact with one another within guide 10 to form the characteristic field patterns of the transmission modes.

When an element having a higher index of refraction than that of the medium within guide 10, such as element 23, is inserted therein, the plane wave components of the waves propagating in guide 10 are refracted or bent when entering and leaving the refractive element 23. This refraction is similar to optical refraction in that it is due to the fact that the wave travels more slowly in the region having the higher index of refraction. This causes different portions of the wave front to travel different distances in the same time period and thereby changes the direction of propagation of the wave front. The angle of refraction is dependent upon the indices of refraction of the two media and the angle of incidence of the plane wave on the media interface. Furthermore, when traveling from a region of low index of refraction to a region of higher index of refraction, the plane wave is bent away from the interface and when travelling from a region of higher index of refraction to a region of lower index of refraction, the plane wave is bent towards the interface. If the plane wave components of a wave in guide 10 are incident upon the interface between element 23 and the medium in guide 10 at the proper critical angle, the angle which these rays will make on leaving element 23 will be zero degrees. That is, for some angle of incidence the wave will never leave the region of the higher index of refraction but will travel along the media interface as a species of surface wave. Under this condition, the wave energy distribution in guide 10 decreases exponentially from the media interface to the guide walls. At angles of incidence less than this critical angle, the wave will be reflected by the interface rather than refracted, and at angles of incidence greater than this critical angle the wave will be refracted and will continue into the medium having the lower index of refraction.

Returning again to Fig. 1, it can be seen that the critical angle of incidence of the plane wave components of wave energy in guide 10 will correspond to some particular frequency for any given mode. This particular frequency will hereinafter be referred to as the critical frequency and depends upon the size and shape of element 23, its composition, and its placement in guide 10. It can easily be shown from the characteristic equation that for a rectangular wave guide such as guide 10 in Fig. 1 with an element such as element 23 centered in the guide and extending between the broader walls thereof, the wavelength corresponding to the critical frequency is given approximately by $$\lambda_c^2=\pi^2 d(\epsilon_2\mu_2-\epsilon_1\mu_1)(a-d) \qquad (1)$$

where $\lambda_c$=wavelength of the critical frequency.
$a$=width of guide.
$d$=width of element 23.
$\epsilon_1,\mu_1$=the dielectric constant and permeability, respectively, of the medium within guide 10.
$\epsilon_2,\mu_2$=the dielectric constant and permeability, respectively, of the material in element 23.

By choosing the proper parameters, the critical frequency may be shifted to any desired point on the response curve of the device shown in Fig. 1.

It should be noted that the optical analogy described above is not strictly consistent with the rigorous mathematical analysis of the filter shown in Fig. 1. For example, the ray approach is based upon the assumption that the wavelength of the radiant energy is very small compared to the other constants in the system. In a wave guide structure such as that shown in Fig. 1, it is a well known fact that the wavelength of the plane wave components of wave energy in guide 10 are a substantial portion of the respective dimensions of guide 10 and of element 23. It is therefore apparent that the ray tracing analysis breaks down completely when applied to the end geometries of element 23. While the ray approach would indicate a critical frequency dependence on end geometry, it is nevertheless a fact that the critical frequency is independent of end geometry. However, once the transition to the dielectric region is complete, the ray analogy is again adequate since the longitudinal dimensions of element 23 are large compared to wavelength. Furthermore, since the energy tends to concentrate in the region having the higher index of refraction, the system acts as if the energy source were within element 23 after a sufficient length of element 23 is traversed to stabilize the field configuration. With this reservation, the filter action of the structure shown in Fig. 1 is substantially as described using the total internal reflection analogy.

In operation, the frequency filter shown in Fig. 1 is excited by a source 11, connected to guide 10 at the end opposite reflecting plate 12, of electromagnetic wave energy in any given transmission mode but preferably the dominant $TE_{10}$ mode of guide 10. The signal supplied by source 11 has frequency components covering a wide frequency range including those components in the desired pass band. Element 23 is chosen so as to produce critical angle refraction of the wave energy in guide 10 for a frequency corresponding to the upper frequency limit of the desired pass band in accordance with Equation 1. All of the frequency components above this critical frequency therefore undergo total internal reflection at the surfaces of element 23 upon attempting to leave this element and travel down guide 10 wholly confined within element 23. Energy in this frequency range decays exponentially outside of element 23 and therefore is not presented to probes 18 and 19 in substantial amounts and is not coupled to guide 20. The uncoupled energy remaining in guide 10 is transmitted to plate 12 where it is reflected and returned toward the source, still being confined within element 23 while passing probes 18 and 19. Frequency components below the critical frequency are not confined within element 23 and are therefore coupled by probes 18 and 19 into guide 20. The cross sectional dimensions of guide 20 may be chosen such that the cutoff frequency of this guide corresponds to the lower frequency limit of the desired pass band. That is, the wider dimension of guide 20 is equal to a half-wavelength of the lower frequency limit of the desired pass band and the narrower dimension substantially equal to one-half of the wider dimension. Frequency components below the cutoff frequency of guide 20 cannot be excited by conductors 16 and 17 of lines 14 and 15, and therefore are reflected back into guide 10 to return towards source 11. The frequency components above the cutoff frequency of guide 20 and below the critical frequency are excited in guide 20 and, due to the reflecting plate 13, travel towards the right hand end of guide 20. Connected to the right hand end of guide 20 is a load 26 capable of utilizing those frequency components between the upper and lower limits of the desired pass band. It can be seen that the device shown in Fig. 1 is a band-pass filter, the upper and lower frequency limits of which are independently adjustable. Furthermore, the response of the filter of Fig. 1 is anharmonic in that it will pass only a single band of frequencies and will reject all others, including the higher multiples of the pass band frequencies.

In Fig. 1, element 23 is shown symmetrically positioned within guide 10 and probes 18 and 19 are shown symmetrically disposed on either side of element 23. It has been found that this symmetry tends to inhibit the formation of the asymmetrical modes, in this case, primarily the $TE_{20}$ mode. This may be necessary if the critical frequency for the $TE_{20}$ mode falls within the frequency band excited in guide 10 by source 11. It should be noted, however, that for many applications, the critical frequency of this mode would be outside the excitation band and hence both element 23 and probes 18 and 19 may be placed anywhere in guide 10 which is found to be desirable so long as they do not coincide. Element 23 may, for example, be placed immediately adjacent to one side wall of guide 10 and only a single probe be used to pick up the energy from the remaining region within guide 10. Furthermore, element 23 is shown in Fig. 1 as extending for a considerable length along guide 10. This is done only for the purposes of clarity since element 23 need only be sufficiently long to accomplish a complete transformation to the new energy distribution for the frequencies above the critical frequency.

In Fig. 2 is shown, for the purposes of illustration, a graphical and qualitative representation of the frequency versus output characteristic of the filter illustrated in Fig. 1. The ordinates of curve 30 represent the wave energy output of guide 20 in arbitrary units. It can be seen that all of the frequency components between the cutoff frequency of guide 20, represented by dashed line 31, and the critical frequency for the loading in guide 10, represented by dashed line 32, are coupled into guide 20 and travel to load 26. It should be apparent that the lower frequency limit of this band of frequencies can be moved down below the lowest frequency to be excited in guide 10 merely by making guide 20 with a sufficiently large broader dimension. A low pass frequency filter is thus obtained in which the frequency limit can be varied at will and which has an essentially anharmonic response. While Figs. 1 and 2 have illustrated the application of the principles of the invention to rectangular refractive elements placed in rectangular wave guides, these principles are by no means restricted to such applications. The remaining figures illustrate the application of these principles to other configurations.

In Fig. 3 is shown a cross sectional view of a wave guide filter in accordance with the principles of the invention comprising a section of circular wave guide 40 capable of supporting a wide range of frequencies of electromagnetic wave energy. Coupled to guide 40 by means of coupling aperture 42 is a section of rectangular wave guide 41 having a broader dimension greater than a half-wavelength of the lowest frequency to be transmitted therein and a narrower dimension equal to substantially one-half of the broader dimension. While only one coupling aperture 42 is shown in cross section, it should be noted that a plurality of such apertures may exist collinearly adjacent to each other in the common wall between guides 40 and 41 and extending longitudinally therealong. Such apertures are designed to couple substantially all of the energy from guide 40 to guide 41 over a broad frequency range in accordance with principles well known to the wave guide art. Located concentrically within and extending longitudinally along guide 40 is a circular rod 43 having an index of refraction substantially greater than the index of refraction of the remaining medium within guide 40. Like element 23 in Fig. 1, rod 43 may be composed of dielectric or permeable material such as, for example, alumina with a dielectric constant of nine.

The wave filter shown in Fig. 3 operates much like the filter shown in Fig. 1. Wave energy introduced into guide 40 has frequency components which will be wholly contained in rod 43 due to internal reflection of the plane wave components of this energy. These components will therefore not be coupled into guide 41 by way of coupling aperture 42. Frequency components below the critical frequency, however, will not be contained within rod 43 and will therefore be coupled into guide 41. The larger dimension of guide 41 may be chosen so that certain of the lower frequency components introduced into guide 40 will be beyond cutoff in this guide. These components of wave energy will therefore not be coupled into guide 41, but will continue down guide 40. It can be seen that the output of guide 41 comprises a band of frequencies between the cutoff frequency of guide 41 and the critical frequency for which total internal reflection occurs in rod 43. Both the upper and the lower band limits of this pass band are independently adjustable, the lower limit by varying the wide dimension of guide 41 and the upper limit by varying the size, composition and placement of rod 43. Furthermore, the response of the filter is anharmonic in that only one frequency band in any given mode will be coupled to guide 41.

It should be noted that the directional coupler produced by a number of collinear apertures in a common wall between two wave guides, such as is represented by aperture 42 between guides 40 and 41 in Fig. 3, does not require a reflecting termination in either of the guides to insure complete transfer of energy between the guides. The filter shown in Fig. 3 is therefore a constant resistance type of filter in which no frequency components are reflected back towards the source. On the contrary, the frequency components which are not coupled from guide 40 into guide 41 will continue down guide 40. These uncoupled frequency components may be utilized by supplying a number of other frequency bands or channels to utilization points further along the line beyond the illustrated coupling aperture 42. It can therefore be seen that a number of filters such as that shown in Fig. 3 inserted in series in guide 40 will result in a channel dropping circuit where each of the associated coupled guides, such as guide 41, picks up a single channel from the multichannel energy in guide 40. It should be apparent that the rectangular wave guide filter shown in Fig. 1 can also be adapted for such channel dropping operation merely by substituting a directional coupler for the probe couplers shown. Furthermore, coupling apertures in the narrower wall of a rectangular wave guide are in a region of low excitation and therefore would not excite the asymmetrical higher order modes even though they are themselves asymmetrically located.

In Fig. 4 is shown a cross sectional view of another embodiment of the invention wherein these principles are applied to a coaxial type of transmission line. In Fig. 4 is shown a coaxial line filter comprising two sections of coaxial lines 50 and 51 having outer conductors 52 and 53 and concentric inner conductors 54 and 55, respectively. Coaxial lines 50 and 51 are coupled together over a substantial portion of their length by coupling apertures such as aperture 56. These coupling apertures are designed to effectuate a substantially complete transfer of wave energy from line 50 to line 51. Located within line 50 and symmetrically surrounding inner conductor 54 is a sleeve 57 of material having an index of refraction substantially greater than the index of refraction of the remaining medium within line 50.

In operation sleeve 57 causes total internal reflection of the frequency components of the wave energy in line 50 above a certain critical frequency, depending on the composition and size of sleeve 57. These frequency components are therefore not coupled into line 51 but continue down line 50. The output of line 51 has a low-pass band characteristic where the upper frequency of the band is the critical frequency at which total internal reflection takes place in sleeve 57 of line 50. If line 50 is excited in the dominant TEM coaxial mode, coupling aperture 56 must interrupt the longitudinal wall currents of this mode to provide the necessary coupling. This may be accomplished, for example, by winding line 51 helically around line 50 and providing a coupling slot between them. The coaxial structure is better suited for operation in the lower frequency ranges where the required size of the wave guide would be prohibitively large. The filter shown in Fig. 4 is anharmonic and has an upper frequency limit which is adjustable in much the same manner as the frequency limits of the filters shown in Figs. 1 and 3.

In all cases, it is understood that the above-described arrangements are simply illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In combination, a conductively bounded transmission path having first and second ends, a source including bands of wave energy between the frequencies $f_1$, $f_2 \ldots f_n$ connected to said first end, means for utilizing the band of wave energy between $f_1$ and $f_2$, means within said conductively bounded path for totally internally reflecting and for exclusively confining plane wave components of frequencies above $f_2$ in a first region including a longitudinal interval in which said first region adjacently co-extends with a second region with an interface therebetween and in which said first region has a first index of refraction that is higher than the index of refraction of said second region by an amount to produce a refraction along said interface of plane wave components at the frequency $f_2$, and means for coupling the wave energy from said second region out of said conductively bounded path to the exclusion of wave energy exclusively in said first region to said means for utilizing said band of wave energy between $f_1$ and $f_2$, said interface being continuous in the region of said coupling means so that the internally reflected band of wave energy above frequency $f_2$ will not be coupled by said coupling means to said utilizing means.

2. The combination according to claim 1, including within said coupling means a second conductively bounded wave guiding structure capable of supporting only those frequencies above the frequency $f_2$.

3. The combination according to claim 1 in which said coupling means is a series of collinear apertures in said conductive boundary.

4. The combination according to claim 1 in which said transmission path comprises a section of rectangular wave guide having a wider dimension greater than a half-wavelength of the lowest frequency component of said signal, the region having the highest index of refraction being a rectangular slab extending longitudinally along said guide parallel to the narrower walls thereof.

5. The combination according to claim 1 in which said transmission path comprises a section of cylindrical wave guide having a circular cross section and the region having the highest index of refraction comprises a circular rod extending concentrically within said guide.

6. The combination according to claim 1 in which said transmission path comprises a section of coaxial line having two concentric circular conductive members, the region of highest index of refraction being a concentric sleeve surrounding the inner one of said concentric members and extending longitudinally along said inner member.

7. The combination according to claim 1 including means for utilizing the bands of wave energy above the frequency $f_2$ connected to said second end wherein said interface is discontinued between said coupling means and said second end so that the internally reflective bands of wave energy above the frequency $f_2$ appear at said second end for transmission to said last-named utilizing means.

8. A device for separating a plurality of frequency channels from a broad band microwave signal comprising the combination according to claim 1 and including a plurality of means located in a respective plurality of longitudinally disposed regions within said path for totally internally reflecting and for exclusively confining plane wave components above the frequency band of each of said channels respectively, and a plurality of means for removing wave energy from each of said regions located transversely adjacent to each of said means for total internally reflecting.

9. An anharmonic band-pass filter comprising a first section of rectangular wave guide, a rectangular slab of wave transmitting material having values of permeability and dielectric constant extending between the centers of the wider walls of said guide parallel to the narrow walls thereof, the remainder of said guide being filled by a medium having values of permeability and dielectric constant, the difference between the product of the dielectric constant and permeability of said slab and the corresponding product of said medium being directly proportional to the square of the wavelength of the upper frequency limit of said passband and inversely proportional to the product of the transverse dimension of said slab and the transverse dimension of said medium exclusive of said slab so that said slab has an index of refraction with respect to said medium that produces total internal reflection of plane wave components of all frequencies of wave energy above said passband, a second wave guide section, and means for coupling wave energy including frequencies below said upper frequency limit from said medium and out of said first section in the region of said slab into said second section.

References Cited in the file of this patent

UNITED STATES PATENTS

| | | |
|---|---|---|
| 2,423,396 | Linder | July 1, 1947 |
| 2,602,893 | Ratliff | July 8, 1952 |
| 2,784,378 | Yager | Mar. 5, 1957 |
| 2,825,765 | Marie | Mar. 4, 1958 |
| 2,849,689 | Kock | Aug. 26, 1958 |
| 2,866,949 | Tillotson | Dec. 30, 1958 |
| 2,870,418 | Hewitt | Jan. 20, 1959 |
| 2,879,484 | Miller | Mar. 24, 1959 |

OTHER REFERENCES

Fox et al.: Bell System Technical Journal, vol. 34, No. 1, January 1955, pages 5–103.